United States Patent [19]

Sadler

[11] Patent Number: 5,303,473

[45] Date of Patent: Apr. 19, 1994

[54] COOKIE CUTTER

[75] Inventor: Robert F. Sadler, Rochester Hills, Mich.

[73] Assignee: Superior Piston Ring Corporation, Detroit, Mich.

[21] Appl. No.: 971,349

[22] Filed: Nov. 4, 1992

[51] Int. Cl.$^5$ .................. B26F 1/38; A21C 11/10
[52] U.S. Cl. ........................ 30/128; 30/130; 30/316; 30/359; 425/299
[58] Field of Search .............. 30/128, 130, 301, 305, 30/315, 316, 359; 425/299

[56] References Cited

U.S. PATENT DOCUMENTS

| | | | |
|---|---|---|---|
| 709,290 | 9/1902 | Zinn | 30/130 |
| 730,792 | 6/1903 | Oliver | 30/130 |
| 967,815 | 8/1910 | McCarty | 30/130 |
| 1,536,685 | 5/1925 | Muirhead | 30/130 |
| 1,649,803 | 11/1927 | Boiarsky | 30/130 |
| 2,008,725 | 7/1935 | Parker | 30/130 |
| 2,106,057 | 1/1938 | Napolillo | 425/299 |
| 2,119,260 | 5/1938 | Valle | 30/316 X |
| 2,310,224 | 2/1943 | Edwards | 30/130 |
| 2,314,401 | 3/1943 | Johnson | 30/130 |
| 2,779,097 | 1/1957 | Frazier | 30/130 |
| 4,836,396 | 6/1989 | Ancona et al. | 30/301 X |

*Primary Examiner*—Richard K. Seidel
*Assistant Examiner*—Raymond D. Woods
*Attorney, Agent, or Firm*—Basile and Hanlon

[57] ABSTRACT

A device for cutting and engaging a doughy material having a deformable consistency, forming a material, transferring the shape from a first location to a second location and disengaging the shape. The device includes a cutting edge carried by a housing for cutting an outline of the shape, a plunger for positively engaging a cut surface of the material to aid in transferring the material from a first location to a second location, recesses and raised shapes located on the plunger for imprinting an exposed surface of the material and aiding in engaging the material, and a handle connected to the plunger for manually actuating the device.

11 Claims, 2 Drawing Sheets

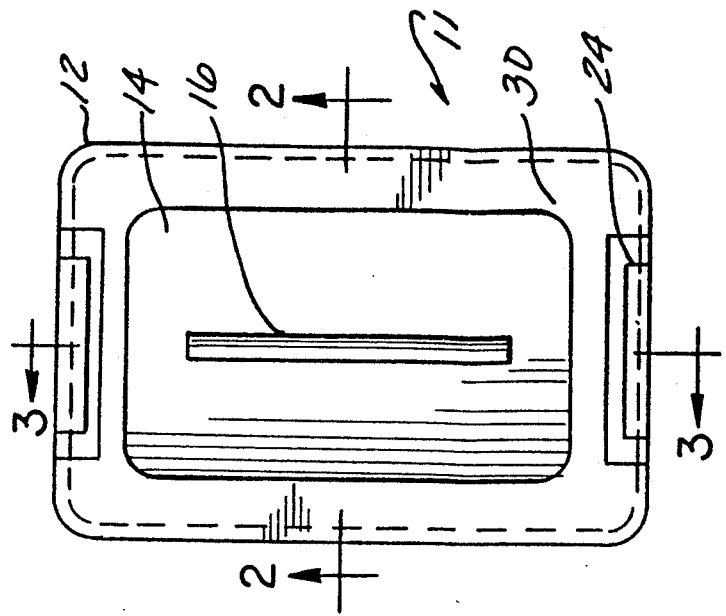
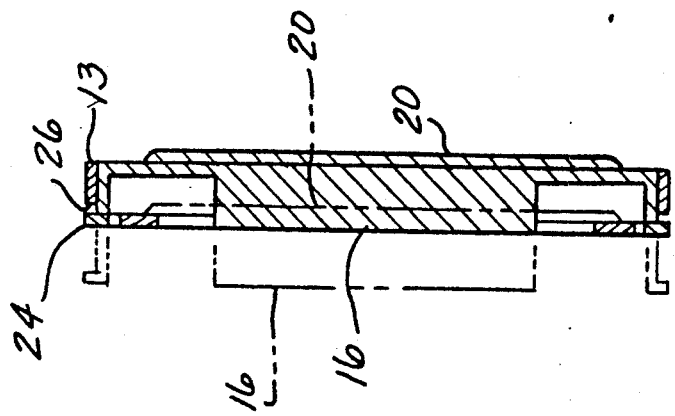
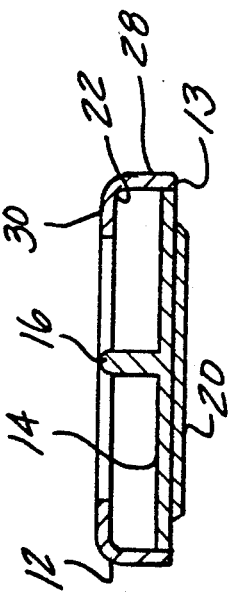

COOKIE CUTTER

FIELD OF THE INVENTION

The present invention generally relates to material cutting devices and, more particularly, is concerned with dough cutting and decorating for ornate pastries.

BACKGROUND OF THE INVENTION

Devices that provide fast and convenient means for making cookies and other pastries are useful and highly demanded products. Cookie cutters are an example of these means and development of new cookie cutters is widely practiced.

Devices for cutting cookies that have been introduced in the past often have a cutting edge and a plunger for discharging the cut piece from the cutting edge. These devices, however, are complicated by multiple parts and do not provide any decorative shaping on the plunger surface for decorating the has been introduced where multiple or interchangeable shapes or decorations are available from a single device.

Examples of devices introduced in the past similar to the present invention are those which employ a housing with a downward facing cutting edge and a flat faced plunger within the housing for discharging the cut dough. Many of these devices further include a spring assembly in their handle for holding the plunger in a normally disengaged position. Although these devices provide for decorative edge cuts, they generally have flat surfaces on their dough plungers with peripheral edges that generally follow the cutting edge. Furthermore, these devices are universally intended for use with non-interchangeable cutting edges.

The present invention provides for a multi-piece disassemblable cookie cutter with interchangeable cutting edges for cutting the outline of the cookie, an interchangeable pushing piston for discharging the cut cookie including an irregularly shaped surface for imprinting a design on the exposed surface of the cookie, and a separate interchangeable imprint die on the surface of the handle for separately imprinting the cookies.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a top view of the preferred embodiment of the present invention in a basic rectangular FIGURE;

FIG. 2 is a front cut-away view of the device taken on line 2—2 of FIG. 1;

FIG. 3 is a side cut-away view of the device taken on line 3—3 of FIG. 1;

DETAILED DESCRIPTION OF THE PREFERRED AND ALTERNATIVE EMBODIMENTS

Figure 4:
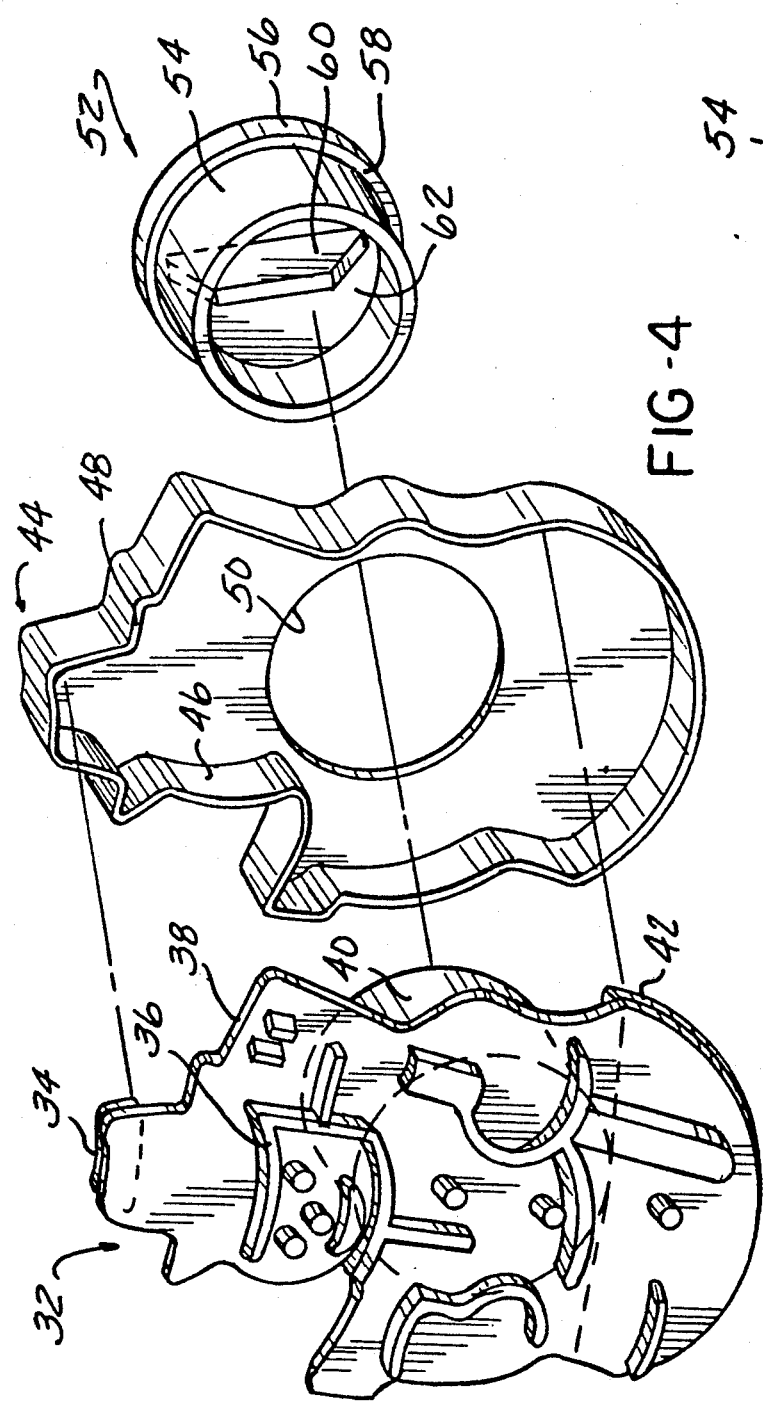
FIG. 4 is a perspective blow-up view of a second embodiment of the present invention.

Referring to the drawings, there is illustrated one example of the present invention in the form of a rectangular cookie cutter 11 in FIG. 1 for use in cutting a shape in dough and imprinting a surface of the shape with an ornamental design. Generally, the cookie cutter 11 includes a housing 12 with a cutting edge 13 carried by the housing for engaging and cutting an outline of the dough. Cutting the outline is accomplished by manually pressing the housing 12 onto the dough, engaging the cutting edge on the dough. The cookie cutter 11 also includes a plunger 14 for engaging a surface of the cut shape by manually pressing a handle 16 onto the cut shape as shown in FIG. 1. Further included on the plunger 14 is imprint means 20 made up of raised shapes and recesses for imprinting an ornate design on the surface of the shape. The housing also includes stand-off curves 22 located at the junction of the side surfaces 28 and top surface 30 of the housing 12 for making a gap between the top surface of the plunger 14 and the inside surface of the housing 12 to avoid sticking of the two parts in the event liquid or doughy material gets stuck in between. Finally, included in the preferred embodiment, is bracket 24 that holds the plunger 14 together with housing 12 while in use and still allowing movement of the plunger relative to the housing for proper operation. The bracket 24 is attached to the plunger 14 and extends over a bracket ridge 26 formed on the housing 12. The preferred embodiment includes two brackets at opposing sides of the cookie cutter with corresponding bracket ridges 26 for holding the plunger 14 together with housing 12 and allowing relative movement therebetween. The plunger 14 can be separated from the housing 12 by pressing the opposing brackets toward each other and slipping them over the bracket ridges 26 thereby unlocking the two parts.

In operation, the cookie cutter of FIG. 1, which is one preferred embodiment, is first engaged onto the dough by pressing housing 12 onto doughy material for cutting an outline of a shape. The plunger 14 is then engaged using handle 16 onto the dough for imprinting a surface of the dough. The dough is now formed on all sides with the housing 12 cutting the outline, the plunger 14 forming a side and the surface which the doughy material is resting opposing the plunger and forming the opposite side. The cookie cutter 11 is then raised using the handle 16 from the surface with the dough being held in the cookie cutter by the side surfaces 28 of the housing and the imprint means 20 and surface of the plunger 14. The cut and formed shape can now be transferred from a first location to a second location and discharged from the cookie cutter by holding the handle 16 and housing 12 and discharging the dough by engaging handle 16 so as to remove the dough from the side surfaces 28 in which it is engaged.

Figure 5:
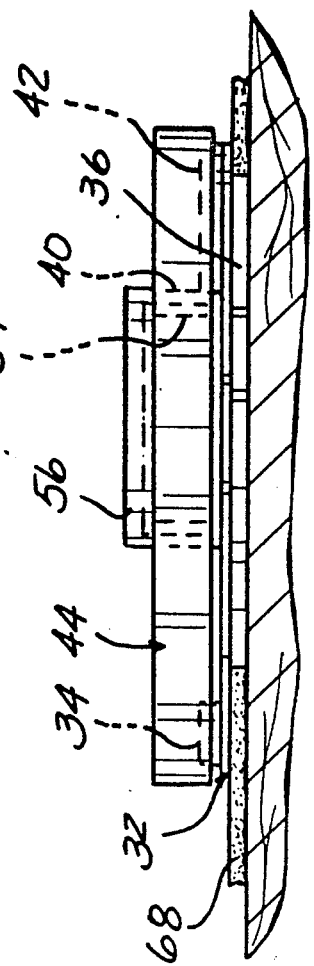
FIG. 5 is a side view of the device of FIG. 6 shown engaged in dough.
Figure 6:
FIG. 6 is a top view of the handle cap of the device of FIG. 6.

A second embodiment of the present invention is shown in FIGS. 4–6 where a cookie cutter includes a plunger 32, a housing 44 and a handle 52. The plunger 32 shown in FIG. 4 includes a top stand-off 34 and a bottom stand-off 42 adjacent an outer peripheral edge 38 for creating a gap between the plunger and the inside surface of the housing 44 avoiding sticking of the two structures in the event liquid or doughy material gets stuck between the two structures when in use. Imprint means 36 are also included on the plunger 32 for imprinting an ornate design on the doughy material. The housing 44 includes a peripheral sidewall 46 for engaging the doughy material and a bottom cutting edge 48 carried by the housing bottom for cutting an outline of the doughy material. Handle 52 includes a cylindrical wedge for connecting to the plunger with a cylindrical handle holder attached to the plunger. In operation, the handle 52 is connected to the handle holder 40 of the plunger 32 through a plunger aperture 50, the handle 52 being press fit with its cylindrical wedge 54 into the handle holder 40. The handle also includes a handle cap with secondary imprint means for imprinting other doughy shapes separate from the cookie cutter. The handle 52 also includes an enlarged portion 56 defining a stopping ridge 58 for holding the handle 52, the housing 44 and the plunger 32 together while in use while also allowing movement of the plunger and handle assembly relative to the housing 44. The handle also includes a finger grip 60 connected to the handle on the inner handle surface 62 for allowing a grip on the handle 52 when the secondary imprint means 64 located on cap surface 66 are being used.

FIG. 5 shows the second embodiment in use engaged on the deformable material 68 with the plunger 32 and imprint means 36 engaged onto the doughy material. In operation the doughy material 68 is engaged as shown in FIG. 5 by plunger 32 and imprint means 36. The housing 44 is then engaged onto the doughy material cutting an outline of the shape. The cut shape can then be transferred from a first location to a second location.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A device for cutting and engaging a material having a deformable consistency, forming a shape with a portion of said material, transferring said portion of said material from a first location to a second location and disengaging said portion of said material, comprising:

a housing with cutting means carried by said housing for cutting an outline of said shape in said material forming a separable, shaped, cut material portion;

material engaging means located within said cutting means of said housing for positively engaging an exposed surface of said cut material portion to aid in transferring said cut material portion from said first location within said housing and for disengaging said cut material portion from said housing for placement at said second location;

first imprinting means carried by and moveable relative to said housing for imprinting said exposed surface of said cut material portion while said housing is engaged with said cut material portion, said first imprinting means for imprinting an ornate design on said exposed surface;

handle means connected to said first imprinting means for manually actuating said first imprinting means; and second imprinting means located on a surface of said handle means for imprinting independently from said first imprinting means.

2. The device of claim 1 wherein said first imprinting means is interchangeable for providing a variety of said ornate designs for impression on said exposed surface of said cut material portion.

3. The device of claim 1 wherein said first imprinting means includes recesses and raised shapes formed on said material engaging means for imprinting said ornate design on said exposed surface of said cut material portion.

4. The device of claim 1 wherein said handle means further comprises:

a removable handle with said second imprinting means located on said handle external of said housing.

5. The device of claim 1 wherein said material engaging means includes a reciprocal member having a material engaging surface located within said housing for positively engaging said cut material portion.

6. A device for cutting and engaging a material having a deformable consistency, forming a shape with a portion of said material, transferring said portion of said material from a first location to a second location and disengaging said portion of said material, comprising:

cutting means having a bottom edge for cutting an outline of said shape in said material forming a separable, shaped, cut material portion;

material engaging means for engaging an exposed surface of said cut material portion for disengaging the cut material portion from said first location with said cutting means;

first imprinting means, located on said material engaging means, for imprinting an ornate design on said exposed surface of said cut material portion while said material engaging means engages said exposed surface; and a removable handle connected to said material engaging means for holding said device and having second imprinting means for forming an alternative ornate design on said exposed surface of said cut material portion independent of said first imprinting means.

7. The device of claim 6, wherein said removable handle further comprises:

a removable knob forming a handle cap with said second imprinting means disposed on a first surface and defined by recesses and raised shapes formed thereon for imprinting said cut material portion, a second surface located on said handle cap defining a finger grip for holding said knob while imprinting said cut material portion with said second imprinting means and wedge means for removably frictionally attaching said removable knob to said material engaging means.

8. The device of claim 7, wherein said removable handle further comprises:

a stopping ridge located on a periphery of said handle cap for holding said cutting means releasably disposed between said handle cap and said material engaging means.

9. A device for cutting a shape from and engaging a material having a deformable consistency, forming a shape with a portion of said material, transferring said portion of said material from a first location to a second location and disengaging said portion of said material, comprising:

a housing having a first wall with an outwardly extending peripheral sidewall, said peripheral sidewall having a peripheral bottom edge for cutting an outline of said shape in said material forming a separable, shaped, cut material portion, said peripheral sidewall for frictionally engaging said cut material portion for facilitating transfer from said first location to said second location and an aperture located within said first wall;

a plunger located within said housing for positively engaging said cut material portion when disengaging said cut material portion at said second location after engagement of said cut material portion with said peripheral sidewall and transfer from said first location, said plunger having first imprinting means including recesses and raised shapes formed on a first surface of said plunger for imprinting ornate designs on a exposed surface of said cut material portion;

a removable handle including a circular handle cap having second imprinting means including an imprint surface with recesses and raised shapes formed thereon for imprinting an alternative ornate design on said exposed surface of said cut material portion, a finger grip surface located on said circular handle cap for holding said handle while forming said cut material portion, and a ridge formed on a peripheral edge of said circular handle cap defining stopping means for limiting relative movement between said plunger and said housing; and complementary interconnecting wedge means for connecting said removable handle to said plunger, said wedge means passing through said aperture in said first wall of said housing such that said first wall of said housing is interposed between said removable handle and said plunger.

10. A device for cutting and engaging a material having a deformable consistency, forming a shape with a portion of said material, transferring said portion of said material from a first location to a second location and disengaging said portion of said material, comprising;

a housing having cutting means carried by said housing for cutting an outline of said shape in said material forming a separable, shaped, cut material portion;

material engaging means located within said housing for positively engaging an exposed surface of said cut material portion for disengaging said cut material portion from said housing for placement at said second location;

first imprinting means carried by said material engaging means and moveable relative to said housing for imprinting said exposed surface of said cut material portion while said housing is engaged with said cut material portion, said first imprinting means for imprinting an ornate design on said exposed surface;

handle means connected to said material engaging means for disengaging said cut material portion from said housing; and stopping means located on said material engaging means for holding said material engaging means and said housing together, said stopping means including a ridge formed on said housing and an outwardly extending bracket formed on said material engaging means, said bracket engageable with said ridge for limiting relative movement between said housing and said material engaging means.

11. The device of claim 10 wherein said stopping means comprises:

first and second brackets formed on opposing sides of said material engaging means and cooperable with first and second ridges formed in opposing sides of said housing.

* * * * *